ELECTRET PHONOGRAPH PICKUP

BACKGROUND OF THE INVENTION

This invention relates to phonograph pickup devices and more particularly to a type of phonograph transducer utilized therein.

In conventional phonograph playback systems, the reproducing pickup devices, conjunctive with the turntable portion thereof, employ various types of transducer cartridges, as for example, magnetic, ceramic crystal and capacitive units. The cartridge head is normally mounted at the forward end of a pivoted pickup arm and incorporates a directly connected micro-sharp needle or stylus which is oriented in a manner to make contact with the surface of a record disc positioned on a rotatable turntable therebeneath. The record to-be-played has a lengthy and finely laid spiral groove, cut therein during recording, to effect a multitude of microscopic curvatures or waves which form a physical contour of the recorded sound. During replay, the stylus of the transducer is lowered to make discrete riding contact with the moving contoured groove in the revolving record, and transmits the minute vibrations therefrom to the transducer unit. The rapid vibratory stylus movements thus conveyed to the transducer are coverted into electrical impulses therein. These signal forms are thence applied to one or more amplifying units, wherefrom the output is channelled to associated speaker reproducers to recreate an audible rendition of the recorded sounds.

The transducer is one of the several components in the phonoplayback system which determines the degree of fidelity and breadth of frequency response in the sound output of the system. When an exceptionally good response is available, such as that afforded by a magnetic pickup unit, the cost of the transducer cartridge is expensive. Likewise, when an inexpensive pickup unit, such as a crystal cartridge, is utilized, the fidelity response often leaves much to be desired. Furthermore, ceramic elements are fragile and are sometimes broken or cracked during assembling of the pickup device. This occurrence of rejects during assembly increases the overall manufacturing costs of the item.

OBJECTS AND SUMMARY OF THE INVENTION

It is an object of the invention to reduce the aforementioned disadvantages and to provide a compact, efficient and inexpensive transducer for phonograph pickup utilization. Another object is to provide a phonograph transducer that can be expeditiously fabricated.

The foregoing objects are achieved in one aspect of the invention by the provision of a relatively inexpensive and efficient kinetoelectric transducer for use in a phonograph pickup arm. The transducer includes at least one first electrode with an electret member oriented contiguous thereto. At least one second electrode is placed in a juxtapositional manner relative to the electret member on the side thereof opposite the first electrode. The second electrode, which has stylus support means attached thereto, is positioned to permit a degree of controlled vibratory movement relative to the electret member. A holding means is formed to retain and position the first and second electrode means and the intermediate electret member, thereby effecting a compact unitized strucutre with the stylus support means protruding therefrom.

DESCRIPTION OF THE PREFERRED EMBODIMENT

For a better understanding of the present invention, together with other and further objects, advantages and capabilities thereof, reference is made to the following specification and appended claims in connection with the aforedescribed drawings.

The nomenclative terminology "kinetoelectric transducer" as referenced herein is intended to be definitive of a vibration sensitive device wherein the kinetic energy resultant from vibratory motion is translated into electrical impulse signals. In this instance, the energy conversion unit is in the form of an electret to be later described. The concept of the present invention is germane to both monaural and stereophonic phonograph pickup applications.

Figure 1:
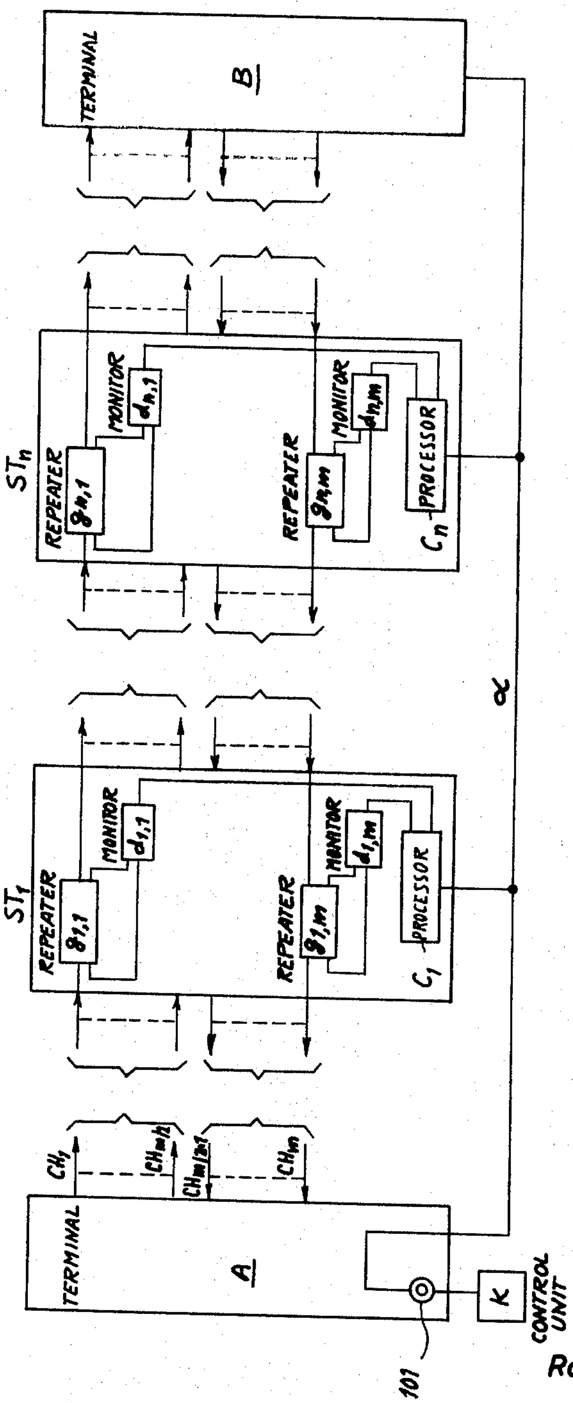
FIG. 1 is a partial cut-away elevational view of the pickup arm illustrating the positioning of one embodiment of the invention.

With reference to the drawings, there is shown in FIG. 1 a parital cut-away elevational view of a phonograph pickup tone arm member 11 whereof the forward extremital portion 13 has mounted therein one embodiment of a kinetoelectric transducer 15 that is adapted to substantially monaural utilization. The opposed supportive extremital portion, not shown, of the tone arm member 11 has pivotal means associated therewith to facilitate predetermined lateral and vertical swivel movement of the arm member. Also, associated with the supportive extremital portion of arm member 11 are conventional arm counterbalancing means, not shown. This compensating means provides for adjustable balancing of the weight of the tone arm, which in turn provides regulation of stylus pressure exerted on the moving groove of the record being sensed.

Figure 2:
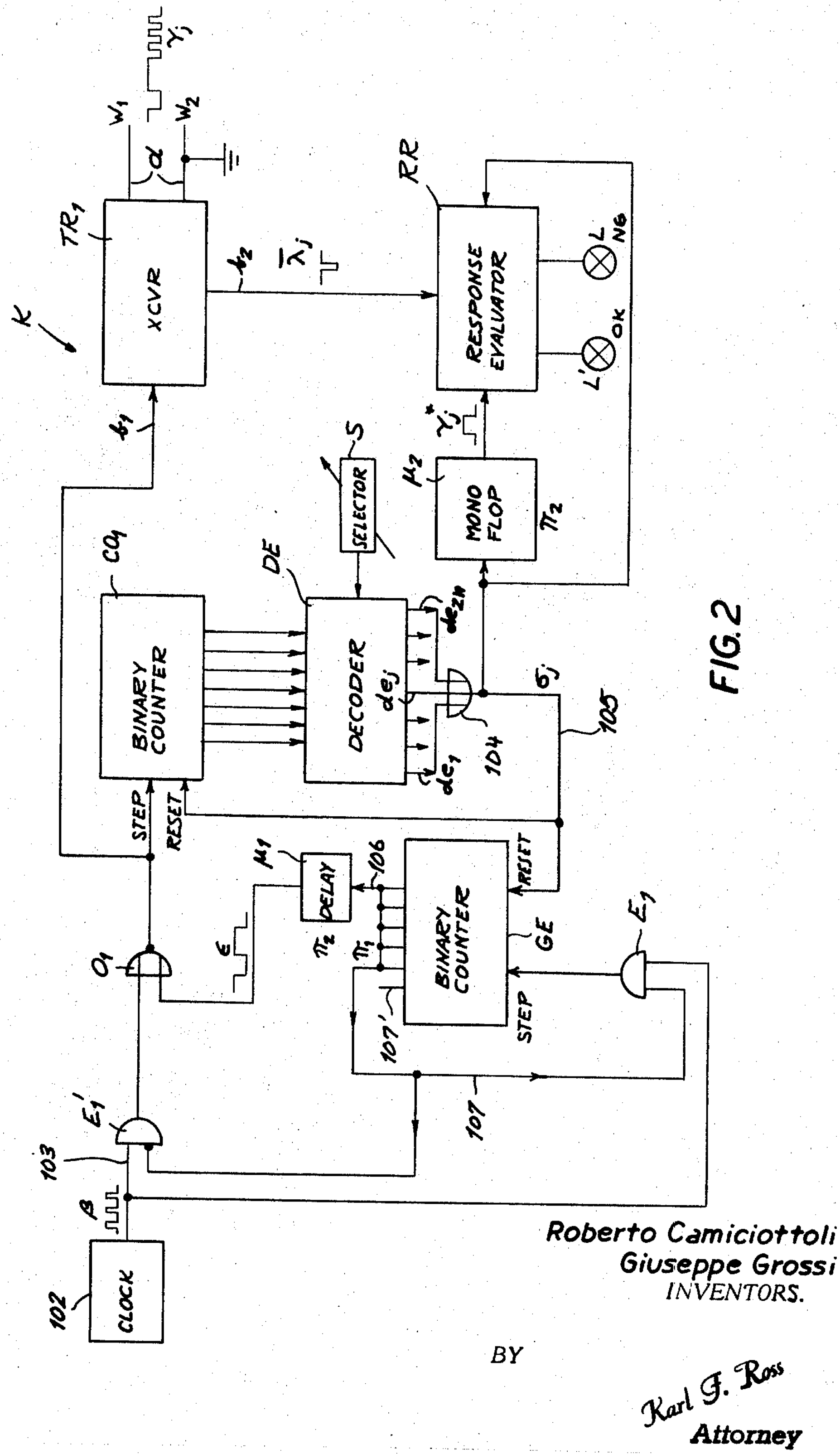
FIG. 2 is an enlarged exploded view showing the elements of one embodiment of the invention.
Figure 3:
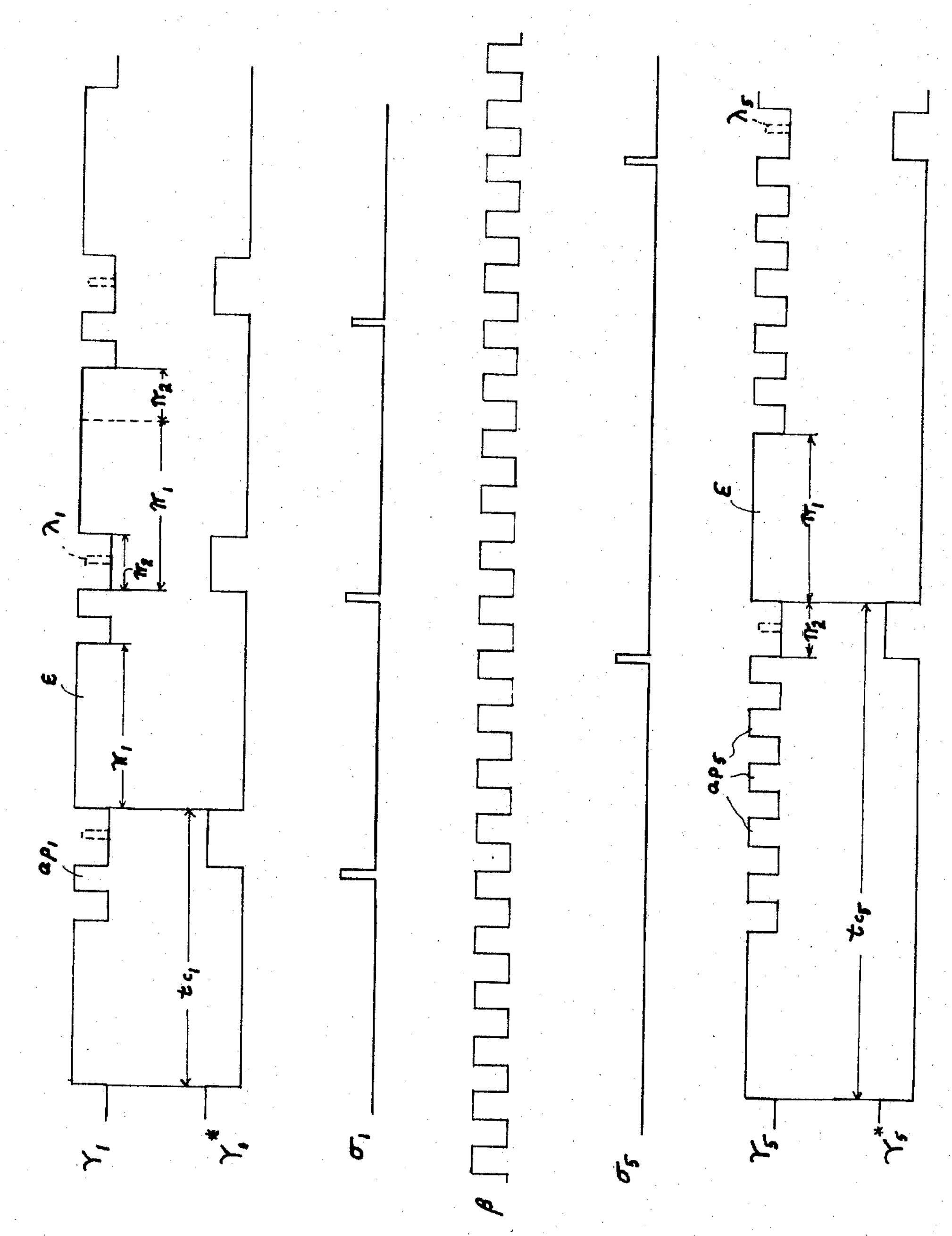
FIG. 3 is an end view illustrating constructional aspects of the invention taken along the line 3—3 of FIG. 1.

In referring to FIGS. 1, 2, and 3, the kinetoelectric transducer cartridge 15 is comprised of at least one first electrode means 19 formed of electrical conductive material, at least one electret member 23, oriented contiguous to the first electrode means 19, and at least one second electrode means 25 which is juxtapositionally oriented relative to the electret member on the side thereof opposite that related to the first electrode means. While the second electrode is adjacent the electret surface, it has freedom for controlled vibratory movement relative thereto. The first and second electrode means, 19 and 25, each have separate respective provisions, 29 and 31, for effecting individual external electrical connections. A stylus support means 33 is attached to the second electrode means 25, and a groove-following needle or stylus member 37 is suitably affixed Roberto Camiciottoli
Giuseppe Grossi
INVENTORS.

BY

Karl F. Ross
Attorney

Roberto Camiciottoli
Giuseppe Grossi
INVENTORS.

BY

Karl F. Ross
Attorney

Roberto Camiciottoli
Giuseppe Grossi
INVENTORS.

BY

Karl F. Ross
Attorney

Roberto Camiciottoli
Giuseppe Grossi
INVENTORS.

BY

Karl F. Ross
Attorney

Roberto Camiciottoli
Giuseppe Grossi
INVENTORS.

BY

Karl F. Ross
Attorney

Roberto Camiciottoli
Giuseppe Grossi
INVENTORS.

BY

Karl F. Ross
Attorney

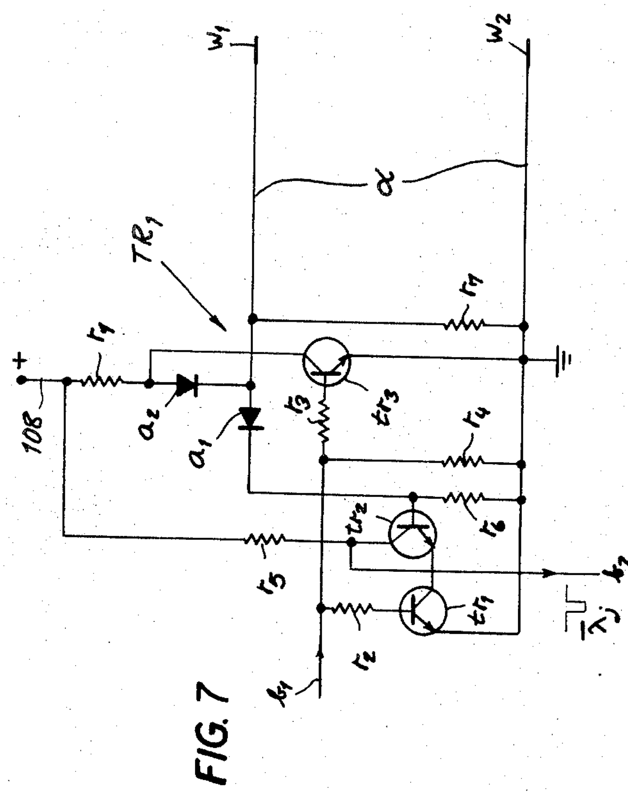
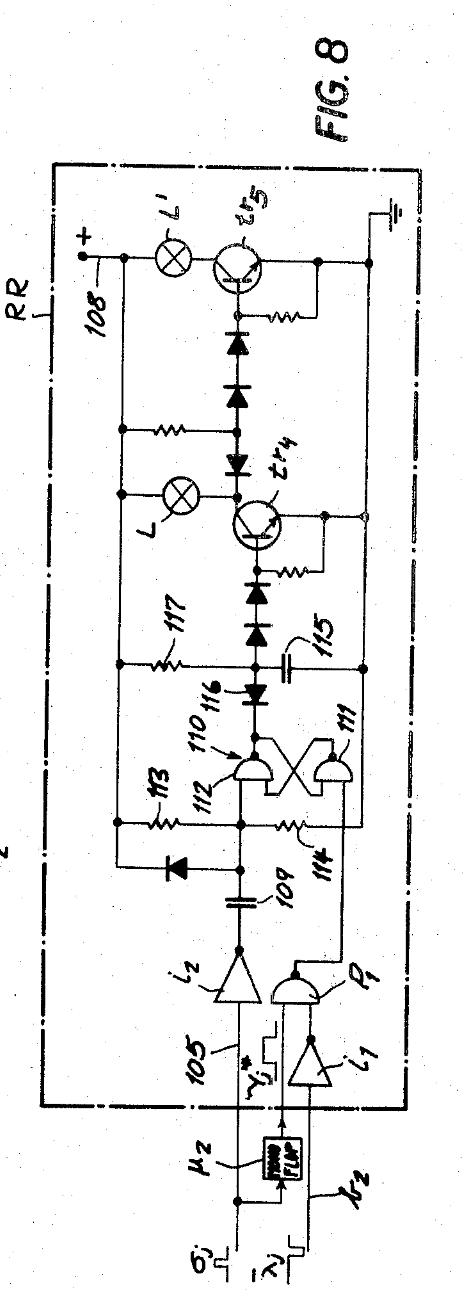
Roberto Camiciottoli
Giuseppe Grossi
INVENTORS.
BY
Karl F. Ross
Attorney R. Camiciottoli
G. Grossi
INVENTORS.

BY

Karl F. Ross
Attorney

SYSTEM FOR THE REMOTE SUPERVISION OF MULTICHANNEL PCM REPEATERS

Our present invention relates to a system for the remote supervision of a number of cascaded repeating stations inserted in the signal path of a multichannel transmission path using pulse-code modulation.

In such a PCM system it is convenient to provide, at each of a series of $n$ repeating stations, a common housing for $m$ repeaters serving a like number of channels. Usually, $m$ is an even number and the repeaters of each stations are divided into two equal subgroups of $m/2$ units each, one subgroup serving for the transmission in one direction whereas the other subgroup handles the opposite traffic.

The general object of our invention is to provide a relatively simple and inexpensive supervisory system through which, with the aid of a single service line common to all the repeating stations, the repeaters of any station can be jointly monitored under the control of a station selector located at either end of the transmission path or possibly at some intermediate point thereof.

A more particular object is to provide, in such a supervisory system, means for monitoring the several repeaters of any selected station regardless of the number of such stations and the length of the transmission path.

A further object is to provide, in such a system, centralized equipment common to all stations along the transmission path or to all repeaters of a given station which may be used with various types of repeaters and independently of the rate of message-pulse transmission over the several channels.

It is also an object of the present invention to provide a system of this character which can be used at any time, without interfering with the simultaneous transmission of messages even if part of the transmitted high-frequency energy is utilized for supplying power to the repeaters and to the supervisory units associated therewith.

These and other objects of our invention are realized by the provision, in a control unit connected to the service line, of a code generator which is selectively settable to produce $n$ different interrogation codes respectively addressed to the several repeating stations. A processor at each of these stations includes a discriminator which is connected to the service line for generating an enabling signal upon detecting an interrogation code addressed to that station, this enabling signal serving to activate a responder also receiving the outputs of $m$ monitoring circuits respectively connected across the several repeaters of that station. If each of these repeaters operates properly, a consent signal is generated which triggers the responder to generate a relay code (in a simple case a single pulse) sent back to the control unit to indicate the satisfactory working ocndition of the interrogated station. If, however, the performance of any repeater is faulty, a succession of error signals generated by the associated monitoring circuit during consecutive test cycles inhibits the generation of the reply code whereby a malfunction indicator at the control unit is actuated to register the defective conditions of one or more repeaters at the interrogated station.

Advantageously, according to a further feature of our invention, the transmission of the reply code is also inhibited upon the prolonged absence of message pulses from one or more channels, in order to avoid the possibility of nonrecognition of a faulty condition for want of proper energization. In fact, the entire energy for operating the repeaters and the associated supervisory components may be obtained from the high-frequency carriers transmitted over the message channels.

More particularly, each monitoring circuit may comprise a push-pull amplifier with two transistor stages connected across the associated repeater, preferably via a coupling transformer, for comparing message pulses concurrently present in the input and in the output of that repeater, any mismatch between the incoming and the outgoing binary words giving rise to one or more unbalance pulses which are accumulated in a first integrator to produce an error signal upon persisting for a number of test cycles. A second integrator is energized by that push-pull amplifier in an unsymmetrical manner, as by being connected to one stage thereof, in order to generate an idleness signal in response to a prolonged absence of incoming message pulses, the output of both integrators being fed through an OR gate to the responder as an inverted consent signal. Since a single unbalance pulse may occupy only a small fraction of a test cycle, we prefer to broaden these pulses in a pulse spreader (such as a monostable circuit or monoflop) to facilitate their integration.

According to still another feature of our invention, the several interrogation codes differ from one another by containing a variable number of address pulses identifying the several repeating stations. Thus, the number of these address pulses may range from 1 through $n$, or preferably through $2n$ in order to distinguish between the outgoing and the incoming repeaters of each station. A first pulse counter in the control unit, stepped by the output of a clock circuit, is presettable (e.g. manually) to identify a selected station by counting a corresponding number of clock pulses and, upon arrival at the selected count, to generate a stop signal which triggers a timing circuit to operate an electronic gate inserted between the source of clock pulses and a transceiver converting these clock pulses into address pulses. The timing circuit suppresses these address pulses for a predetermined recovery interval during which another timing means, such as a monoflop, switches the transceiver from a transmitting condition to a receiving condition for an answer-back period constituting a predetermined fraction of that interval. At the interrogated repeating station identified by the address pulses, a second pulse counter receiving the interrogation code from another transceiver generates the enabling signal for the responder upon termination of the incoming address pulses on a count individual to that station.

The first transceiver, at the control unit, and the second transceiver, at each repeating station, are synchronized by a line voltage which is generated by the first transceiver to indicate its transmitting or receiving condition; the second transceiver thereupon assumes a complementary condition, i.e. a receiving state when the control unit transmits and vice versa. Such a transceiver, according to still another feature or our invention, may comprise a first and second transistor in series, a third transistor sharing a common input (base) lead with the first transistor, and a biasing circuit in a connection extending from the output of the third transistor to the input of the second transistor. With this arrangement, a receiving condition is established by continuous energization of the common input lead with saturation of the first and third transistors whereby pulses arriving over the output (collector) lead of the third transistor are reproduced on the output (collector) lead of the second transistor; intermittent energization of the common input lead establishes a transmitting condition with generation of pulses in the output of the third transistor to the exclusion of that of the second transistor.

Yet a further feature of our invention resides in the provision, within the control unit, of a signal evaluator connected to the associated transceiver for receiving therefrom the reply code during the aforementioned answer-back period; the malfunction indicator, which may include visual alarm means such as a lamp lighting in the event of nonarrival of the replay code from an interrogated station, is actuated by this evaluator which advantageously includes a flip-flop settable by the replay code and resettable by the stop signal from the associated pulse counter. Advantageously, the control unit is designed as a portable module adapted to be plugged into the service line at either terminal of the signal path or at any intermediate repeating station. In this manner, not only a straight transmission path but also a branched (e.g., star-shaped) network may be checked out by our improved system.

Figure 4:
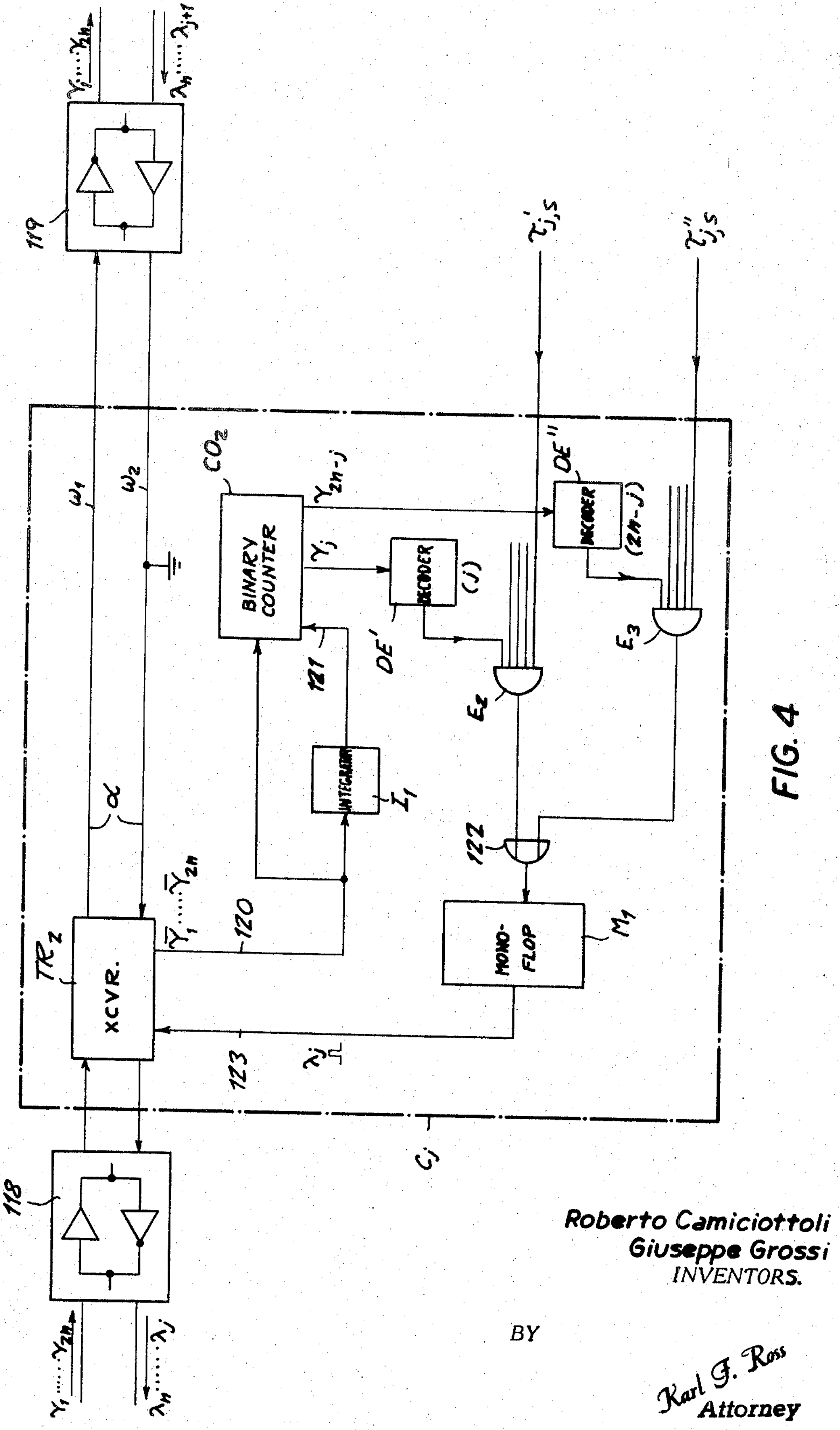
FIG. 4 is a diagrammatic portrayal delineating operational aspects of the invention.
Figure 5:
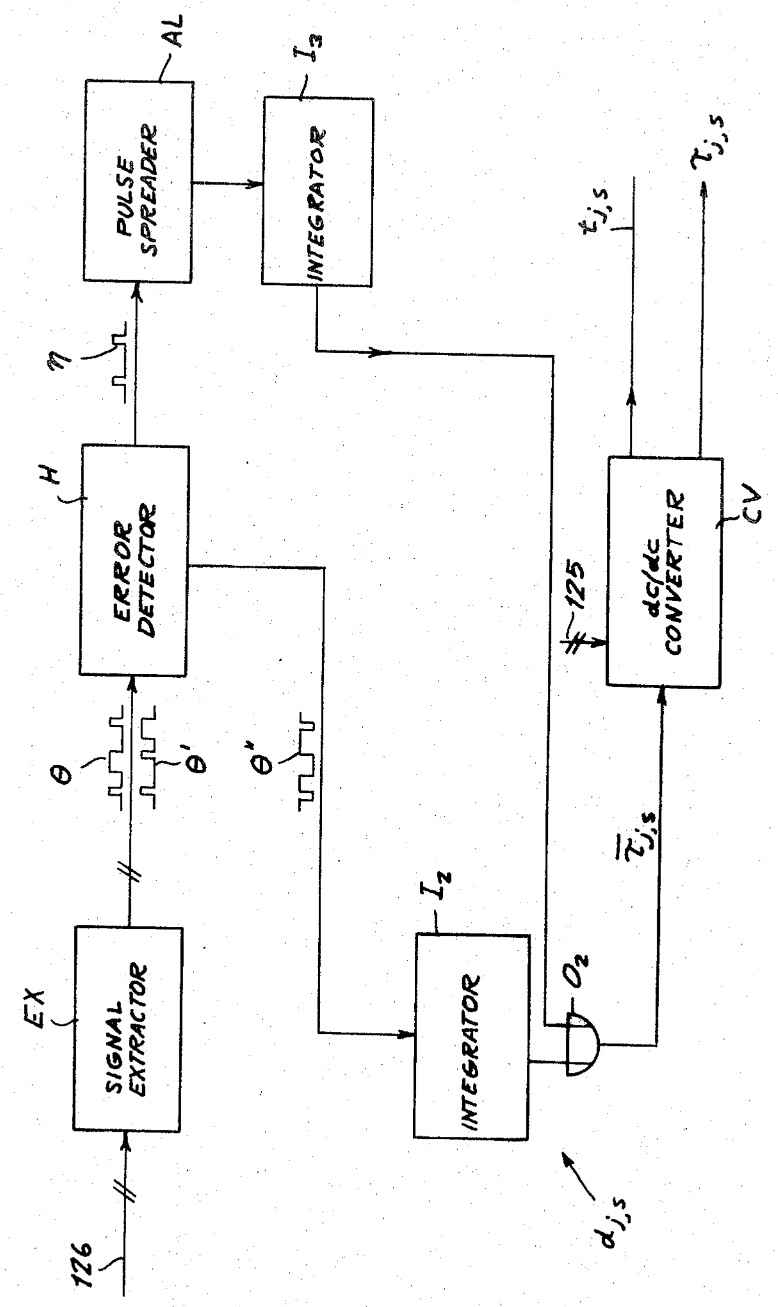
FIG. 5 is a perspective view of another embodiment of the invention.
Figure 6:
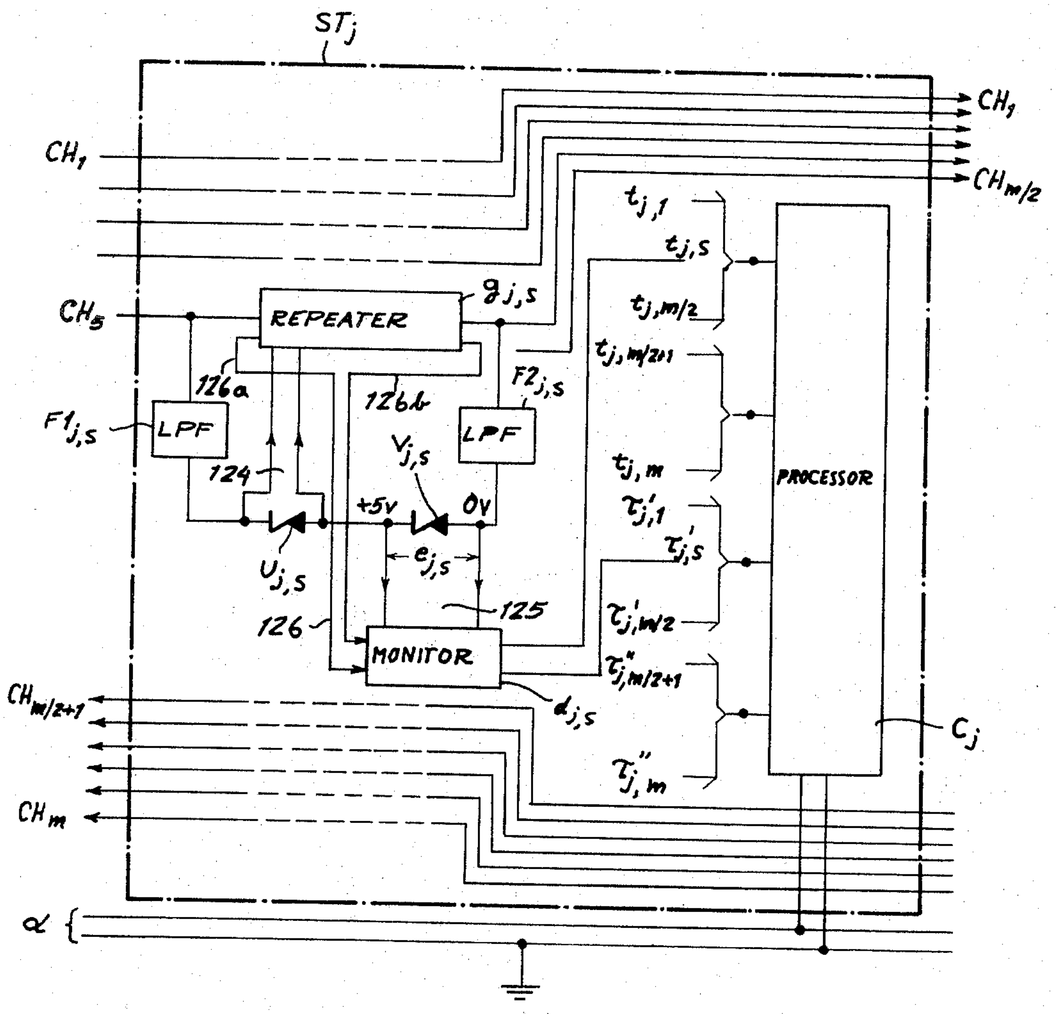
FIG. 6 is an enlarged view of substantially the end portion taken along the line 6—6 of FIG. 5.
Figure 9:
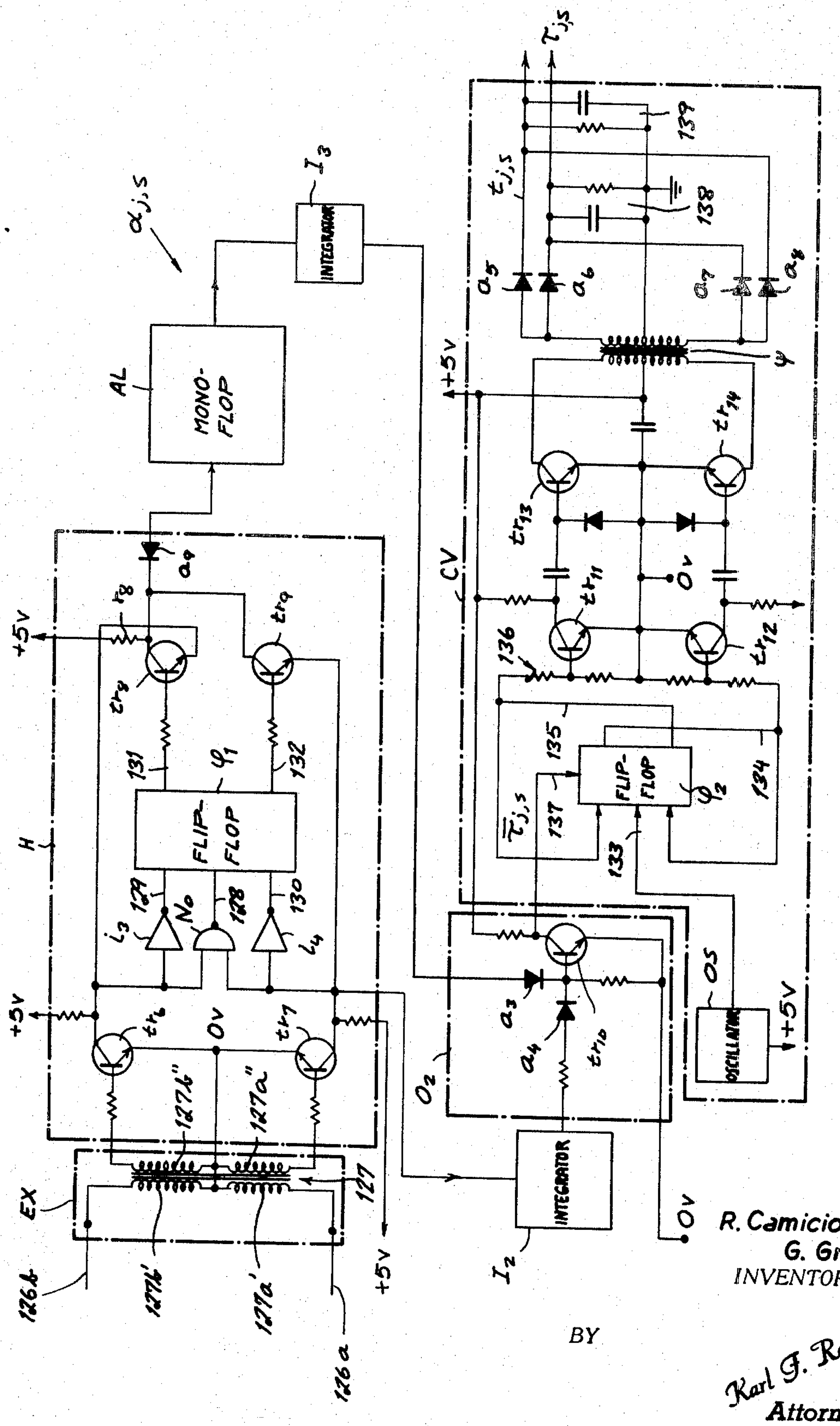

The above and other feature of our invention will be described in detail hereinafter with reference to the accompanying drawing in which:

FIG. 1 is an overall block diagram of a supervisory system embodying our invention;

FIG. 2 is a more detailed block diagram of a control unit forming part of the system;

FIG. 3 is a set of graphs serving to explain the operation of the control unit of FIG. 2;

FIG. 4 is a more detailed block diagram of a processor in a repeating station included in the system of FIG. 1;

FIG. 5 is a block diagram showing the several components of a monitoring circuit also forming part of the repeating station;

FIG. 6 is an overall block diagram of the representative constituents of the repeating station;

FIG. 7 is a circuit diagram showing details of a transceiver included in the control unit of FIG. 2;

FIG. 8 is a circuit diagram of a signal evaluator forming part of the same control unit; and FIG. 9 is a more detailed schematic of the monitoring circuit shown in FIG. 5.

FIG. 1 shows part of a transmission path, extending between two terminal stations A and B, which includes a number of repeating stations $ST_1 \ldots ST_n$. These repeating stations, generically designated $ST_j$ hereinafter and illustrated in detail in FIG. 6, are all of identical construction and include a plurality of repeaters $g_{1,1} \ldots g_{1,m}$ through $g_{n,1} \ldots g_{n,m}$ (generically referred to hereinafter by the designation $g_{j,x}$). These repeaters serve $m/2$ outgoing channels $CH_1 \ldots CH_{m/2}$, transmitting from terminal A to terminal B, and $m/2$ incoming channels $CH_{m/2+1} \ldots CH_m$, transmitting in the opposite direction. Connected across each repeater within the station housing is a monitoring circuit $d_{1,1} \ldots d_{1,m}$ through $d_{n,1} \ldots d_{n,m}$ (generically designated $d_{j,x}$), all the monitoring circuits of one station working into a common processor $C_1 \ldots C_n$ (generically designated $C_j$) inside the housing.

All the processors $C_1 \ldots C_n$ are connected in parallel to a service line $\alpha$ extending between terminals A and B. At terminal A, a control unit K is plugged into the station housing at 101 to connect with line $\alpha$; this unit could also be pluggable into the housings of repeater stations $ST_1 \ldots ST_n$ or of terminal B.

Details of processing unit K have been illustrated in FIG. 2. A binary counter $CO_1$ works into a decorder DE with output leads $de_1 \ldots de_{2n}$ any one of which can be marked by a manual selector S for energization upon attainment of the corresponding pulse count. A clock circuit 102 emits a continuous pulse train $\beta$ on a lead 103 terminating at two AND gates $E_1$ and $E'_1$; gate $E'_1$ works through a NOR gate $o_1$ into a stepping input of counter $CO_1$ and in parallel therewith into an input lead $b_1$ of a transceiver $TR_1$. This transceiver is directly connected across the service line $\alpha$ shown to consist of two wires $w_1$ and $w_2$, the latter being grounded. An output lead $b_2$ of transceiver $TR_1$ extends to a response evaluator RR provided with visual indicating means in the form of a pair of lamps L and L'. As will be explained hereinafter, lamp L40 lights when an interrogated repeating station operates properly whereas lamp L is illuminated upon the detection of a faulty condition at that station, as determined by an interrogation code $\gamma_j$ transmitted over the line $\alpha$ and the presence or absence of a reply code $\gamma_j$ appearing on lead $b_2$.

Decoder DE generates a stop signal $\sigma_j$ on an output lead $de_j$ as soon as counter $CO_1$, after having been set to zero, has received the corresponding number ($j$) of clock pulses $\beta$ from source 102. Signal $\sigma_j$ transverses an OR gate 104, combining all the output leads of decoder DE, and appears on a lead 105 terminating at respective resetting inputs of counter $CO_1$ and response evaluator RR. Lead 105 is further connected to a monoflop $\mu_2$, feeding an input of evaluator RR, and to a resetting input of a timing circuit GE also constituted by a binary pulse counter. Timer GE has a number of counting stages with interconnected output leads merging into a conductor 106, which extends to the second input of NOR gate $o_1$ by way of a delay circuit $\mu_1$, and into another conductor 107 tied to the second input of AND gate $E_1$ and to the inverting second input of AND gate $E'_1$.

Upon the energization of lead 106, circuit $\mu_1$ generates a delayed pulse $\epsilon$ after a time $\pi_2$ which equals the off-normal period of monoflop $\mu_2$ and is a fraction of a recovery interval $\pi_1 + \pi_2$ measured by timer GE. This recovery interval starts as soon as the timer is reset by pulse $\sigma_j$ on lead 105 and energizes the leads 106 and 107 for a predetermined number of clock cycles. Voltage on lead 107 now blocks the gate $E'_1$ but opens the gate $E_1$ to the clock pulses $\beta$ whereby the timing counter is progressively stepped until the energization shifts from output lead 107 to a lead 107' which need not have any physical existence but has been indicated only for the sake of explanation. At this point, gate $E_1$ is closed to arrest the count whereas gate $E'_1$ is opened to pass the clock pulses $\beta$ to NOR gate $o_1$.

Reference will now be made to FIG. 3 which illustrates the results of the mode of operation just described. The top graph of that Figure represents an interrogation code $\gamma_1$ destined for the first repeating station $ST_1$ of FIG. 1; the second-lowest graph shows the corresponding code $\gamma_5$ addressed to the fifth repeating station of the system. These two codes, appearing on line $\alpha$ in alternate positions of selector S, differ from each other by the number of address pulses occurring in their respective test cycles $tc_1$ and $tc_5$. Thus, code $\gamma_1$ has a single address pulse $ap_1$ per cycle whereas code $\gamma_5$ has five such pulses $ap_5$. These address pulses are generated in the output of transceiver $TR_1$ by the clock pulses $\beta$ which traverse the AND gate $E'_1$ and cut off the NOR gate $o_1$ as long as the timer lead 107 is not energized. Since these clock pulses also reach the counter $CO_1$, stop signal $\sigma_1$ or $\sigma_5$ is generated (depending on the position of selector S) after one or five clock cycles, respectively, as shown in the third and fifth graphs of FIG. 3. With the appearance of this stop signal, the voltage on lead 107 shifts the clock pulses $\beta$ from counter $CO_1$ to counter GE which now advances, maintaining the energization of the lead 107 for a certain number of clock cycles (three in the example of FIG. 3) which together constitutes a timing interval $\pi_1$. During the first portion $\pi_2$ (here equaling one clock cycle) of this timing interval, however, delay circuit $\mu_1$ has no output so that NOR gate $o_1$ conducts and energizes the input lead $b_1$ of transceiver $TR_1$, thereby substantially grounding the wire $w_1$ of line $\alpha$ as will be more fully described hereinafter with reference to FIG. 7; this period $\pi_2$, preceding the appearance of signal $\epsilon$ in the input of gate $o_1$, represents an answer-back interval during which a reply code in the form of a pulse may come back from the addressed station over line $\alpha$. Coincidentally with this answer-back interval, a pulse $\gamma^*_1$ or $\gamma^*_5$ ($\gamma^*_j$ in FIG. 2) appears in the output of monoflop $\mu_2$ as illustrated in the second graph and the last graph of FIG. 3, respectively, thereby making the evaluator RR receptive to the reply pulse, if any, on lead $b_2$. It should be noted that the pulse appearing in the output of NOR gate $o_1$ during the period $\pi_2$ does not advance the counter $CO_1$ into a position effective to energize any of the outputs of decoder DE; this may be accomplished by a suitable extension of the decay period of the resetting pulse derived from signal $\sigma_j$, or by the insertion of a dummy stage in the counter.

As shown in FIG. 7, tranceiver $TR_1$ comprises three NPN resistors $tr_1$, $tr_2$ and $tr_3$. The bases of transistors $tr_1$ and $tr_3$ are connected to input lead $b_1$ through respective resistors $r_2$ and $r_3$, this lead being returned to ground through a further resistor $r_4$. The base of transistor $tr_2$ is connected to an intermediate point of a voltage divider inserted between ground (i.e., wire $w_2$ of line $\alpha$) and positive potential on a bus bar 108, this voltage divider being constituted by two resistors $r_1$, $r_6$ as well as two diodes $a_1$, $a_2$ in series therewith. The junction of diodes $a_1$ and $a_2$ is tied to line wire $w_1$ and is connected to ground through a resistor $r_7$ which with resistor $r_1$ constitutes another voltage divider including the diode $a_1$. A further resistor $r_5$ connects bus bar 108 to output lead $b_2$ tied to the collector of transistor $tr_2$ whose emitter is directly joined to the collector of transistor $tr_1$. The emitters of transistors $tr_1$ and $tr_3$ are grounded, the collector of transistor $tr_2$ being connected to the junction of transistor $r_5$ with diode $a_2$.

With input lead $b_1$ de-energized, as is the case upon the blocking of NOR gate $o_1$ (FIG. 2) by the delayed timing pulse $\epsilon$ or the clock pulses $\beta$ traversing the gate $E'_1$, transistors $tr_1$ and $tr_3$ are cut off so that line wire $w_1$ is maintained at a high positive potential as determined by voltage divider $r_1$, $r_7$. This positive potential, communicated to the base of transistor $tr_2$ through diode $a_1$, has no effect upon the voltage of lead $b_2$ in view of the high impedance of transistor $tr_1$; lead $b_2$, therefore, is also energized at this time. When input lead $b_1$ goes positive, i.e., during intervals between clock pulses $\beta$ and during the answer-back period $\pi_2$, transistors $tr_1$ and $tr_3$ are saturated so that wire $w_1$ is effectively grounded through diode $a_2$. With the base of transistor $tr_2$ similarly grounded through diodes $a_1$ and $a_2$ in series, output lead $b_2$ remains de-energized in the absence of positive pulses coming in over wire $w_1$. The arrival of such a positive pulse $\lambda_j$ FIG. 2) during the answer-back period, in which evaluator RR is responsive to the potential of lead $b_2$, saturates the transistor $tr_2$ so that lead $b_2$ is de-energized for the duration of the pulse.

FIG. 8 illustrates the effect of pulses $\sigma_j$ and $\lambda_j$ upon the evaluator RR. This evaluator comprises two further NPN transistors $tr_4$ and $tr_5$ connected in cascade, through conventional coupling circuits, with the lamps L and L' inserted in their respective collector leads. Transistor $tr_4$ is driven by a flip-flop 110 with two cross-connected stages 111 and 112 constituted by respective NAND gates. The active input of stage 111 is joined to lead $b_2$ through an inverter $i_1$ and a NAND gate $P_1$ having another input energizable by the output signal $\lambda^*_j$ of monoflop $\mu_2$; the corresponding input of stage 112 is connected to lead 105 through an inverter $i_2$ in series with a capacitor 109.

In the operation of the evaluator RR, stop signal $\sigma_j$ on lead 105 resets the flip-flop 110 (if it was previously set), thereby momentarily de-energizing the corresponding input of NAND gate 112 which therefore becomes conductive, cutting off the companion stage 111. With lead $b_2$ concurrently energized (transceiver $TR_1$ having been switched into its receiving condition as described in conjunction with FIG. 7), the appearance of pulse $\lambda^*_j$ in the other input of that NAND gate has no immediate effect upon the condition of flip-flop 110 but makes the same switchable by a subsequently arriving twice-inverted reply pulse $\sigma_j$. The appearance of the latter pulse, cutting off the NAND gate $P_1$, energizes the output of stage 111 so that stage 112 becomes nonconductive, condenser 109 having meanwhile recharged to a positive potential through a voltage divider 113,114 connected between ground and bus bar 108. This operation discharges a capacitor 115 through a diode 116, thereby cutting off the transistor $tr_4$ and firing the transistor $tr_5$. Lamp L is extinguished and lamp L' lights to indicate the correct functioning of the repeaters at the tested station.

If the reply pulse $\lambda_j$ is not forthcoming before the disappearance of timing pulse $\lambda^*_j$, NAND gate $P_1$ is locked conductive so that flip-flop 110 does not switch. In this case the capacitor 115, charged from bus bar 108 through a resistor 117, initiates or maintains the conduction of transistor $tr_4$ with illumination of alarm lamp L. Transistor $tr_5$ is cut off with extinction of lamp L'.

Reference will now be made to FIG. 4 for a description of the processor $C_j$ of the generalized repeating station $ST_j$. This processor comprises a transceiver $TR_2$, connected across line $\alpha$, whose construction may be similar to that of transceiver $TR_1$ described with reference to FIG. 7. Since, however, this circuit inverts the signals passing therethrough, we have shown a pair of unidirectionally effective reinverting stages 118 and 119 on opposite sides of transceiver $TR_2$.

With the transceiver $TR_1$ of control unit K (FIG. 2) in its transmitting condition, interrogation codes $\gamma_1 \ldots \gamma_{2n}$ pass through the transceiver $TR_2$ over line $\alpha$ and also appear on a lead 120 branched off the wire $w_1$ of that line. Lead 120 extends to an integrator $I_1$ and, in parallel therewith, to a stepping input of a binary counter $CO_2$ similar to counter $CO_1$ of unit K. Counter $CO_2$ feeds two associated decoders DE' and DE'' respectively responding to counts of value "$j$" and "$2n$-$j$". Thus, decoder DE' has an output whenever an interrogation code $\gamma_j$ is transmitted over the line to check the operation of the $m/2$ repeaters of station $ST_j$ transmitting in the direction of traffic from terminal A to terminal B (FIG. 1); decoder DE'' responds to an interrogation code $\gamma_{2n-j}$ addressing the remaining repeaters of station $ST_j$ which serve for the transmission from terminal B to terminal A. Decoder DE' works into an input of an AND gate $E_2$ having a multiplicity of other inputs which receive respective consent signals, generically designated $\tau'_{j,s}$, from the several monitoring circuits associated with the first subgroup of $m/2$ repeaters; in an analogous manner, decoder DE'' feeds an AND gate $E_3$ having a multiplicity of additional inputs connected to receive similar consent signals $\tau''_{j,s}$ from the monitoring circuits serving the second subgroup of $m/2$ repeaters. The subscript $s$ denotes a generalized channel transmitting in either direction.

The appearance of the inverted interrogation codes $\overline{\gamma}_1 \ldots \overline{\gamma}_{2n-j}$ on lead 120 loads (i.e., drives negative) the integrator $I_1$ whose output thereupon permits the counter $CO_2$ to be stepped by the address pulses of that code. Upon the cessation of these address pulses, the output voltage of the integrator goes positive and, at 121, commands the destructive readout of the count to decoders DE', DE'' with simultaneous resetting of the counter $CO_2$ to zero. This readout takes place in the second half of the answer-back period $\pi_2$ (see FIG. 3) and, if the count matches the setting of either decoder, conditions the AND gate $E_2$ or $E_3$ for conduction of all the other inputs of that gate are simultaneously energized by consent signals $\tau'_{j,1} \ldots \tau'_{j,m/2}$ or $\tau''_{j,m/2+1} \ldots \tau''_{j,2m}$ (cf. FIG. 6). The output of the conducting AND gate then trips a monoflop $M_1$, via an OR gate 122, to generate the reply pulse $\lambda_j$ on a lead 123 which joins the live line wire $w_1$ within transceiver $TR_2$.

It will thus be apparent that, as shown in FIG. 4, all the interrogation codes $\gamma_1 \ldots \gamma_{2n}$ pass successively from left to right through the transceivers $TR_2$ of the $n$ repeating stations of the system whereas the individual reply codes $\lambda_j$ travel from right to left, i.e., toward control unit K through the transceivers of all the intervening stations.

FIG. 6 shows the consent signal $\tau'_{j,s}$ as originating from a monitoring circuit $d_{j,s}$ associated with a repeater $g_{j,s}$ of station $ST_j$ serving a channel $CH_s$ which, in this particular instance, serves for the transmission of PCM messages from left to right, i.e., from terminal A to terminal B. Two low-pass filters $F1_{j,s}$ and $F2_{j,s}$, connected across that channel upstream and downstream of the repeater, supply d-c energy to both the repeater and the associated monitor. Thus, a power line 124 is branched across a rectifying impedance $U_{j,s}$, shown as a Zener diode, to feed the repeater $g_{j,s}$ while another power line 125, branched across the similar impedance $V_{j,s}$, delivers an operating voltage $e_{j,s}$ to circuit $d_{j,s}$. The conductors 126*a*, 126*b* carry message pulses to the monitoring circuit from the input and output sides of the repeater, respectively; the accompanying carrier wave may be suppressed by suitable filters not shown. In its turn, monitor $d_{j,s}$ supplies operating current via a line $t_{j,s}$ to the associated components within processor $C_j$; two sets of such power lines $t_{j,1} \ldots t_{j,m/2}$ and $t_{j,m/2+1} \ldots t_{k,2m}$ serve the two halves of the processor assigned to channels $CH_1 \ldots CH_{m/2}$ and $CH_{m/2+1} \ldots CH_{2m}$, respectively.

We shall now describe the overall layout of the generic monitoring circuit $d_{j,s}$ with reference to FIG. 5. A line 126, symbolically indicated as consisting of two wires (i.e., the conductors 126*a*, 126*b* of FIG. 6), feeds a signal extractor EX which delivers PCM message pulses $\Theta$ to an error detector H. The latter, upon ascertaining a mismatch between the incoming pulses $\Theta$ and their outgoing counterparts $\Theta'$, generates error pulses $\eta$ which are broadened to a pulse spreader AL and then delivered to an integrator $I_3$. Another integrator $I_2$ receives, directly from detector H, an inverted replica $\Theta''$ of the incoming pulse $\Theta$ so as to have a definite output voltage whenever these pulses are absent for an extended period. The output voltage of integrators $I_2$ and $I_3$, if of sufficient magnitude to indicate a predetermined pulse gap or a sequence of error pulses, traverse or OR gate $O_2$ to generate an error signal $\overline{\tau}_{j,s}$ which may be regarded as the complement of the consent signal $\tau_{j,s}$ and is applied to a blocking input of a *dc/dc* converter CV normally supplying both the consent signal and the energy for power line $t_{j,s}$.

As more fully illustrated in FIG. 9, signal extractor EX comprises a coupling transformer 127 with primary windings 127*a'*, 127*a''* and secondary windings 127*b'*, 127*b''*. These windings are all connected to a common junction tied to the "zero-potential" terminal OV voltage source $V_{j,s}$ (FIG. 6) whose high-voltage terminal, assumed by way of example as being maintained at a relatively positive potential of 5 volts, has been designated ÷5V in both FIG. 6 and FIG. 9. Primaries 127*a'* and 127*b'* are respectively energized by conductors 126*a* and 126*b* with incoming and outgoing message pulses, Secondaries 127*a''*, 127*b''* are connected in the base/emitter cirduits of respective transistor stages $tr_6$, $tr_7$ of a push-pull amplifier in error detector H whose collectors are connected to respective inputs of a NAND gate $N_o$ serving to energize the switching input 128 of a flip-flop $\phi_1$ of the type (known as J-K) wherein the presence of biasing potential on either of two control inputs 129, 130 upon the occurrence of a switching pulse determines the energization of a corresponding output 131 or 132. The collector of transistor $tr_6$ is further connected to flip-flop input 129 by way of an inverter $i_3$ and to the emitter of a gating transistor $tr_8$ having its base tied to output 131; in an analogous manner, the collector of transistor $tr_7$ feeds the flip-flop input 130 through an inverter $i_4$ and is also tied to the emitter of a gating transistor $tr_9$ whose base is connected to output 132. The collectors of both transistors $tr_8$ and $tr_9$ are energized from high-voltage terminal +5V through a resistor $r_8$ and are connected through a diode $a_o$ to the input of monoflop AL serving as the pulse spreader so designated in FIG. 5.

The original and regenerated message pulses respectively arriving over leads 126*a* and 126*b* are not of exactly the same amplitude, or else the transformer 127 is not perfectly balanced, so that a residual pulsation develops in the secondary windings 127*a''*, 127*b''* even if the repeater works properly. This pulsation of fed from the collector of transistor $tr_7$ to integrator $I_2$ whose output, through a diode $a_4$, reaches the base of transistor $tr_{10}$ in OR gate $O_2$ also receiving the output of integrator $I_3$ through a diode $a_3$. Monoflop AL loads the integrator $I_3$ whenever the two pulse trains on leads 126*a* and 126*b*, to a compared in error detector H, deviate sufficiently from each other to drive the collector of transistor $tr_6$ or $tr_7$ so far negative as to render the corresponding gating transistor conductive, a condition which requires the concurrent energization of flip-flop output 131 or 132, respectively. Comparator EX, H presents a relatively high load impedance to the pulses transmitted over line 126 so that the effect of its connection across the channel is negligible insofar as the transmission of messages is concerned.

If neither of the two integrators $I_2$, $I_3$ has a high enough output voltage to fire the transistor $tr_{10}$, a flip-flop $\phi_2$ in converter CV (of the same type as flip-flop $\phi_1$) is periodically switched by the oscillator OS working into its common input 133; the outputs of the flip-flop are cross-connected, by leads 134 and 135, to the biasing inputs thereof and are also connected across a voltage divider 136 working into the cascaded push-pull amplifiers, i.e., a switching amplifier consisting of transistors $tr_{11}$, $tr_{12}$ and a power amplifier consisting of transistors $tr_{13}$, $tr_{14}$. Through an output transformer $\psi$, the latter amplifier energizes the supply lead $t_{j,s}$ by way of a two-way rectifier including a pair of diodes $a_5$, $a_8$ and also generates the consent signal $\tau_{j,s}$ unless flip-flop $\phi_2$ inhibited by an error signal $\overline{\tau}_{j,s}$ applied to a blocking input 137 thereof by the conducting transistor $tr_{10}$.

Thus, whenever carrier voltage is present on the channel $CH_s$, the terminals marked +5V in FIG. 9 are energized and oscillator OS operates; if properly matched incoming and outgoing message pulses are picked up by conductors 126*a* and 126*b*, transistor $tr_{10}$ remains cut off and processor $C_j$ is fed from converter CV. Integrating networks 138 and 139 maintain the converter outputs energized in the case of short-term interruptions of the square wave delivered by flip-flop $\tau_2$.

The above-described principles may also be utilized in branched telecommunication systems. Thus, for example, the division of repeaters and monitoring circuits inside a station into subgroups respectively assigned to two directions of transmission may be extended to distinguish among channels following different routes.

We claim:

1. A system for the remote supervision of a series of *n* repeating stations inserted in a PCM signal path with *m* channels, each station containing m repeaters individually assigned to said channels, comprising:

a service line extending along said path;

a control unit connected to said line for transmitting interrogation codes thereover to said stations during successive test cycles and receiving reply codes therefrom indicative of the performance of the repeaters of each station, said control unit including a code generator selectively settable to produce *n* different interrogation codes respectively addressed to said stations;

a group of m monitoring circuits respectively connected across the *m* repeaters of each station for generating error signals upon improper performance of any repeater;

a processor at each station including discriminator means connected to said line for generating an enabling signal upon detecting an interrogation code addressed to the respective station, said processor further including responder means connected to said discriminator means and to said monitoring circuits for generating a reply code in the presence of said enabling signal and in the absence of any error signal; and indicator means in said control unit for registering the nonarrival of a reply code in a succession of test cycles;

each of said monitoring circuits comprising a push-pull amplifier connected across the associated repeater for comparing message pulses concurrently present in the input and in the output of the latter, a first integrator connected to said amplifier for generating an error signal in response to a succession of unbalance pulses indicating a mismatch, and a second integrator connector to the repeater input for generating an idleness signal in response to prolonged absence of incoming message pulses, said responder means being connected to both said integrators for generating and reply code only in the absence of both error signals and idleness signals.

2. A system as defined in claim 1 wherein each monitoring circuit includes a supply of operating current for said processor and logic circuits responsive to a succession or error signals for cutting off said operating current.

3. A system as defined in claim 1 wherein said push-pull amplifier comprises two transistor stages and a coupling transformer with a secondary winding connected across the inputs of said stages, said monitoring circuit further including bistable means inserted between said push-pull amplifier and said first integrator, said second integrator being connected to the output of one of said stages.

4. A system as defined in claim 3, further comprising a pulse-broadening circuit inserted between said bistable means and said first integrator.

5. A system as defined in claim 1 wherein m is an even number, said repeaters and monitoring circuits being divided into two equal subgroups serving for the transmission of PCM messages over said path in two directions, said discriminating means being provided with two outputs for generating two separate enabling signals in response to interrogation codes identifying either of said subgroups, said processor being divided into two halves each connected to a respective subgroup of monitoring circuits, said responder means having two inputs each connected to a respective output of said discriminating means and to a respective half of said processor.

6. A system as defined in claim 1 wherein said control unit comprises a source of clock pulses, a first pulse counter connected to said source, selector means for setting said first pulse counter to produce a stop signal upon its count reaching a value assigned to a selected repeating station, first transceiver means on said line switchable between a transmitting condition and a receiving condition, gating means inserted between said source and said first transceiver means for converting said clock pulses into address pulses, first timing means responsive to said stop signal for operating said gating means to terminate the transmission of said address pulses upon said counter reaching said assigned value and to resume such transmission after a predetermined recovery interval, and second timing means responsive to said stop signal for establishing said receiving condition during an answering-back period constituting a predetermined fraction of said recovery interval; said discriminator means comprising second transceiver means on said line responsive to a line voltage indicative of the condition of said first transceiver means for assuming a complementary condition, and a second pulse counter connected to said second transceiver means for receiving said address pulses therefrom and for generating said enabling signal upon termination of said address pulses on a count individual to the respective station.

7. A system for the remote supervision of a series of a repeating stations inserted in a PCM signal path with m channels, each station containing m repeaters individually assigned to said channels, comprising:

- a service line extending along said path;
- a control unit connected to said line for transmitting interrogation codes thereover to said stations during successive test cycles and receiving reply codes therefrom indicative of the performance of the repeaters of each station, said control unit including a code generator selectively settable to produce n different interrogation codes respectively addressed to said stations;
- a group of *m* monitoring circuits respectively connected across the m repeaters of each station for generating error signals upon improper performance of any repeater;
- a processor at each station including discriminator means connected to said line for generating an enabling signal upon detecting an interrogation code addressed to the respective station, said processor further including responder means connected to said discriminator means and to said monitoring circuits for generating a reply code in the presence of said enabling signal and in the absence of any error signal; and
- indicator means in said control unit for registering the nonarrival of a reply code in a succession of test cycles;
- said control unit comprising a source of clock pulses, a first pulse counter connected to said source, selector means for setting said first pulse counter to produce a stop signal upon its count reaching a value assigned to a selected repeating station, first transceiver means on said line switchable between a transmitting condition and a receiving condition, gating means inserted between said source and said first transceiver means for converting said clock pulses into address pulses, first timing means responsive to said stop signal for operating said gating means to terminate the transmission of said address pulses upon said count reaching said assigned value and to resume such transmission after a predetermined recovery interval, and second timing means responsive to said stop signal for establishing said receiving condition during an answer-back period constituting a predetermined fraction of said recovery interval; said discriminator means comprising second transceiver means on said line responsive to a line voltage indicative of the condition of said first transceiver means for assuming a complementary condition, and a second pulse counter connected to said second transceiver means for receiving said address pulses therefrom and for generating said enabling signal upon termination of said address pulses on a count individual to the respective station.

8. A system as defined in claim 7 wherein at least one of said transceiver means comprises a first transistor and a second transistor in series, said first transistor having a first output connection, a third transistor having a second output lead, said first and third transistors being provided with a common input lead, said second transistor having an input connection extending to said second output lead, and biasing means in said input connection for establishing a receiving condition upon energization of said common input lead with saturation of said first and thrid transistors whereby pulses arriving over said second output lead are reproduced on said first output lead, pulsing of said common input lead causing intermittent energization of said second output lead to the exclusion of said first output lead.

9. A system as defined in claim 7 wherein said control unit further comprises a signal evaluation connected to said first transceiver means for receiving said reply codes therefrom, said signal evaluator being further connected to said second timing means for enablement during said answer-back period and to said indicator means for actuating same upon the nonarrival of a reply code in a succession of answer-back periods.

10. A system as defined in claim 9 wherein said signal evaluator includes a flip-flop connected to be reset by said stop signal and to be set by said response code.

* * * * *

PO-1050
(5/69)

UNITED STATES PATENT OFFICE
CERTIFICATE OF CORRECTION

Patent No. 3,760,127 Dated 18 September 1973

Inventor(s) Roberto CAMICIOTTOLI et al

It is certified that error appears in the above-identified patent and that said Letters Patent are hereby corrected as shown below:

In the heading, line [73], for the designation of the assignee read:

-- SOCIETA' ITALIANA TELECOMUNICAZIONI SIEMENS s.p.a., --
Milan, Italy

Signed and sealed this 16th day of April 1974.

(SEAL)
Attest:

EDWARD M. FLETCHER, JR.
Attesting Officer

C. MARSHALL DANN
Commissioner of Patents